United States Patent [19]
Taft

[11] Patent Number: 5,352,255
[45] Date of Patent: Oct. 4, 1994

[54] NOISE MAKER FOR AIR FILTER

[76] Inventor: Andrew A. Taft, P.O. Box 1583, Houston, Tex. 77251

[21] Appl. No.: 48,451

[22] Filed: Apr. 5, 1993

[51] Int. Cl.$^5$ .................. B01D 35/14; G01L 19/12
[52] U.S. Cl. .................. 55/274; 55/DIG. 34; 116/70; 116/DIG. 25
[58] Field of Search .................. 55/274, DIG. 34; 116/67 R, 70, DIG. 25

[56] References Cited

U.S. PATENT DOCUMENTS

| | | | |
|---|---|---|---|
| 1,724,101 | 8/1929 | McClure | 116/70 |
| 1,863,456 | 6/1932 | Smith | 55/274 |
| 2,630,111 | 3/1953 | Zide | 116/70 X |
| 2,630,112 | 3/1953 | Zide | 116/70 X |
| 2,630,113 | 3/1953 | Zide | 116/70 X |
| 2,682,250 | 6/1954 | Ulrich | 55/274 X |
| 3,529,407 | 9/1970 | Nowicki | 55/274 |
| 3,587,212 | 6/1971 | Nowicki | 55/274 |
| 3,699,749 | 10/1972 | Nowicki | 55/274 |
| 3,736,900 | 6/1973 | Nowicki | 55/274 X |
| 3,740,931 | 6/1973 | Nowicki | 55/274 |
| 4,134,358 | 1/1979 | Heermans | 116/70 |
| 4,162,660 | 7/1979 | Albertson et al. | 55/274 X |
| 4,321,070 | 3/1982 | Bede | 55/274 |
| 4,418,637 | 12/1983 | Heermans | 116/70 |
| 4,747,364 | 5/1988 | Horowitz | 55/274 X |
| 4,776,296 | 10/1988 | Heermans | 116/70 |
| 5,057,821 | 10/1991 | Card | 55/274 X |

FOREIGN PATENT DOCUMENTS

| | | | |
|---|---|---|---|
| 2333071 | 1/1975 | Fed. Rep. of Germany | 55/274 |
| 2410497 | 8/1979 | France | 55/274 |
| 909034 | 10/1962 | United Kingdom | 55/274 |

*Primary Examiner*—Robert Spitzer
*Attorney, Agent, or Firm*—Harrison & Egbert

[57] ABSTRACT

A noise maker having a housing with a hole formed on at least one surface of the housing and a weighted member in resilient relationship over the hole. The weighted member is movable between a first position closing the hole to a second position for allowing a desired volume of air to flow through the hole so as to produce an audible sound. The weighted member is slidably mounted on a dowel rod within the housing. A slider plate is provided with a plurality of hole sizes formed thereon. The slider plate is interposed between the hole and the weighted member. The hole is formed on a first planar surface of the housing. The housing has an opening formed on a second planar surface of the housing. The first and second planar surfaces are in parallel relationship. A chamber extends between these surfaces. The surfaces in the chamber are permanently coupled together. The chamber has a rectangular configuration.

16 Claims, 3 Drawing Sheets

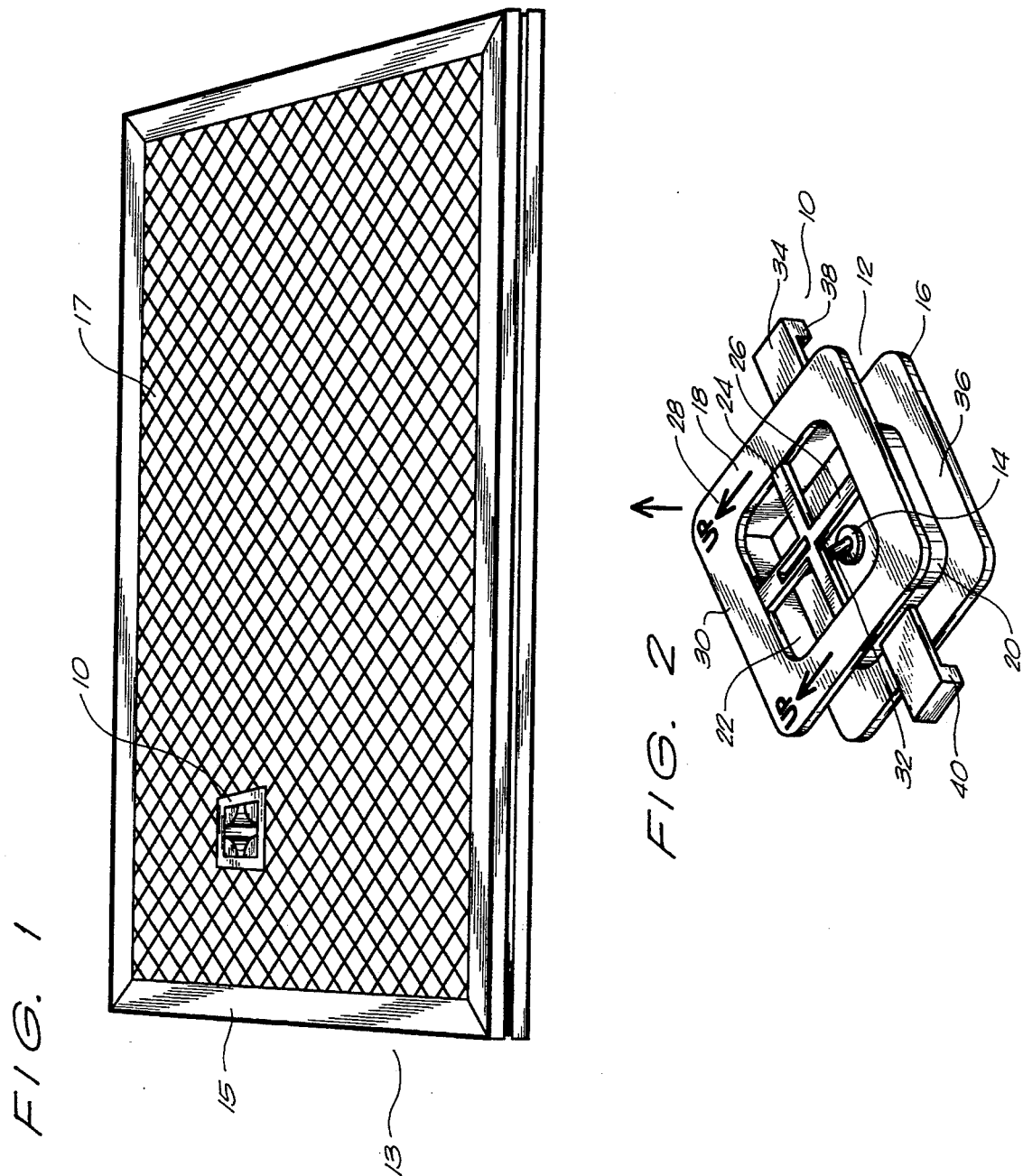

NOISE MAKER FOR AIR FILTER

TECHNICAL FIELD

The present invention relates to the noise making devices that are responsive to a flow of air. More particularly, the present invention relates to noise makers for signalling a clogged air filter.

BACKGROUND ART

Throw-away type air filters have been on the market for many years. These throw-away air filters have been made for both consumer and commercial use in HVAC systems. These inexpensive filters provide protection mainly for the HVAC system itself. These filters are provided so that large objects are captured before they can cause damage to the fan motor and other components. In general, these low-efficiency filters were not intended to capture smaller particles of dust, pollen and mold that pass through to the indoor environment.

A very large number of permanent-type air filters have recently entered the market. These permanent-type air filters are generally made of a rigid aluminum frame. The filter material is received between two walls of expanded metal material. The filter material is made of a very pliable material having little or no interior strength. The expanded metal material can be used to form a honeycomb shape around the filter material. The expanded frame is used to support the filter material within the frame.

There have been several types of signalling devices for air filters on the market for some time. Some of these devices feature whistle holes. It is known from U.S. Pat. No. 2,753,831, to Davies, to provide an air filter clogging warning apparatus in which a whistle is secured within a tube which extends through the filters, the tube being affixed in the filter by a funnel-shaped portion at its upstream end and a washer affixed adjacent its downstream end. This patent also contemplates the provision of screen over the mouth of the funnel-shaped end of the tube. It is also known to provide whistles and vibrating reed warning devices in conjunction with carburetor air intake filters so as to signal when the filters are clogged and in need of replacement. Various patents have described such a device, including U.S. Pat. Nos. 1,770,094 to Wickersham; U.S. Pat. No. 1,863,456 to Smith; and U.S. Pat. Nos. 3,529,407, 3,699,749, 3,737,900, and 3,740,931 to Nowicki.

U.S. Pat. No. 4,321,070, issued on Mar. 23, 1982, to J.D. Bede describes a whistling device that has a simple two-part construction molded of plastic material. This device includes a first flanged part which is inserted through the filter from the upstream end thereof and with a disk-like part being snapped over the downstream end of the first part so as to constitute a flange on the downstream side of the filter and to form a whistle at the downstream end of the filter which emits a shrill tone when the pressure drop across the filter reaches a predetermined value. When a clogged condition of the filter is indicated, the two-part whistle therein may be quickly and easily removed from the clogged filter and reinserted into a new filter for reuse.

In General, these devices were designed for low efficiency type "throw-away filters", and as a result, they were specifically designed to be interchanged from one filter to another. As the old dirty filter was removed and discarded, a new clean filter was installed. These devices, especially U.S. Pat. No. 4,321,070 to Bede, were made in a round cylindrical configuration, in order to fit snugly into the round holes commonly found in the outer aluminum mesh of throw-away filters. Therefore, the Bede device, in particular, had to be both round and of a two piece, removable design.

This type of design, although adequate for throw-away filters, is undesirable for permanent/reusable type filters, due to the likelihood that the noise maker could be removed from the filter, or otherwise fall out of the filter as the consumer performs periodic washing that is required for permanent filters. This would leave the filter with a large, gaping hole through which a great amount of dust and other debris could pass.

Typically, the whistle hole in these devices was manufactured in a permanently open position. This was not of much significance in "low efficiency" air filters, as these types of filters normally capture only a small percentage of airborne dust and contaminants. Therefore, the presence of an opening in the whistle device was not much of a detriment to the overall ability of the filter to perform its function. However, this "open hole" configuration is undesirable for permanent/reusable filters, as these types of filters are normally "high efficiency" filters; designed to capture a much greater amount of dust and other contaminants than common throw-away filters. Therefore, the open whistle hole allows an unacceptable amount of dust and dirt to be sucked through the noise maker, totally bypassing the fine filtering materials intended to arrest such particles.

Another disadvantage of these previous noise makers is their inherently round design. This design precludes the possibility of having any type of easily differentiated "up" position of the noise maker relative to the sides of the filter. Such a configuration would be necessary for the optimum performance of a noise maker device.

The whistle holes of existing noise makers for air filters are manufactured in only one size. This is not very effective for actual working conditions. Typically, the fan/filter size combination, found in the average home, can vary dramatically. As a result, a household with a particularly large fan relative to the filter size will typically experience a whistle sound before the filter has become even lightly clogged. Conversely, a household with a particularly small fan relative to the filter size will not ever detect a whistle tone from the noise maker, even when the filter is completely clogged.

It is an object of the present invention to provide a noise maker device that is constructed of one-piece construction which cannot be opened or disassembled.

It is another object of the present invention to provide a noise maker device that has a relatively square design so as to be easily marked so as to indicate which direction is "up", relative to the sides of the filter into which it is affixed.

It is another object of the present invention to provide a noise maker device having a suitable means for keeping the whistle hole closed until the filter becomes clogged.

It is a further object of the present invention to provide e noise maker device having a whistle hole of variable size such that the Whistle hole can be adjusted for the desired sound level for all types of fan or filter combinations in residential homes and commercial structures.

It is still a further object of the present invention to provide a noise maker device that is indicative of a clogged condition of en air filter.

It is still another object of the present invention to provide a noise maker device that is relatively inexpensive, easy to operate, and easy to manufacture.

These and other objects and advantages of the present invention will become apparent from a reading of the attached specification and appended claims.

SUMMARY OF THE INVENTION

The present invention is a noise maker apparatus for an air filter that comprises a housing having a hole formed on at least one surface of the housing, and a weighted member in resilient relationship over the hole. The weighted member is movable from a first position closing the hole to a second position for allowing a desired volume of air to flow through the hole so as to produce an audible sound.

The housing has the hole formed on a first surface of the housing. This housing has en opening formed on another surface. The weighted member is interposed between the first and second surfaces. The housing has a generally rectangular chamber extending between the first and second surfaces. The weighted member is positioned within this chamber.

The weighted member is a discoidal member having a diameter greater then that of the hole. This discoidal member is restrictive of air flow through the hole when in the first position. The weighted member is slidably mounted on a dowel rod within the housing. The weighted member is at a lowermost position on the dowel rod when in the first position. The weighted member is on a higher level of the dowel rod when in the second position. The dowel rod has a lowermost end positioned centrally of the hole. The dowel rod extends upwardly and outwardly from this hole. The weighted member is responsive to the pressure change across the hole. The weighted member is movable into the second position in response to the pressure change beyond a desired level.

The present invention includes a means for varying the diameter of the hole. This means is affixed in slidable relationship to the housing. In particular, this means is a slider plate having a plurality of hole sizes formed therein.

The air filter extends around the exterior of the housing. The housing can be permanently affixed to the air filter.

The housing has a hole formed on a first planar surface. An opening is formed on a second planar surface of the housing. These planar surfaces are in generally parallel relationship. The housing has a chamber extending between these first and second planar surfaces. The planar surfaces and the chamber are permanently coupled together.

BRIEF DESCRIPTION OF THE DRAWINGS

FIG. 1 is a perspective view showing the noise maker of the present invention as positioned on an air filter.

FIG. 2 is a perspective view of the noise maker apparatus in accordance with the preferred embodiment of the present invention.

DETAILED DESCRIPTION OF THE INVENTION

Figure 4:
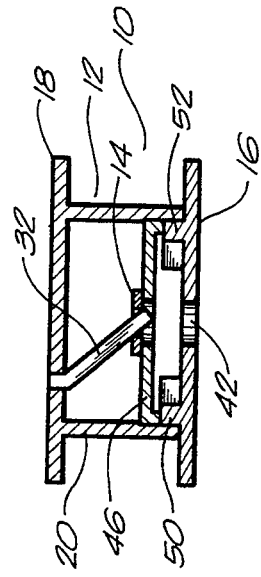
FIG. 4 is a transverse cross-sectional view of the noise maker apparatus of the present invention.

Referring to FIG. 1, there is shown at 10 the noise maker apparatus in accordance with the the present invention. As can be seen, the noise maker apparatus 10 is placed on an air filter 13. The air filter 13 is of the permanent-type air filter. The air filter 13 includes a frame 15 of a rectangular configuration that extends around the filter material 17. The filter material 17 can take a wide variety of configurations. The filter material 17 will include a polyester fiber received within sheets of polypropylene material. These sheets of material are received within the frame 15 and supported in a proper condition extending across this frame 15.

The noise maker apparatus 10 is positioned on the air filter 13 so as to extend through the filter material 17. The noise maker apparatus 10 is positioned somewhat off-center of the filter material 17 across the frame 15. This off-center positioning is designed so as to avoid a location which would be susceptible of interference by the housing of a ventilation system. If the noise maker apparatus 10 were positioned centrally of the filter material 17, then it is likely that a frame portion of the housing would interfere with the proper operation of the noise maker apparatus 10. It is desirable that the noise maker apparatus 10 be located on the filter material 17 in a location which is relatively free of obstructions to air flow. In FIG. 1, the noise maker apparatus 10 is shown in its position facing the downstream flow of air through the filter 13. As will be described hereinafter, the noise maker apparatus 10 is permanently affixed to the air filter 13.

FIG. 2 shows the preferred embodiment of the noise maker apparatus 10 of the present invention. The noise maker apparatus 10 has a housing 12 and a weighted member 14. The housing 12 includes a first planar surface 16, a second planar surface 18, and a chamber 20 extending therebetween. A hole is formed in the first planar surface 16 (to be described hereinafter). The weighted member 14 is positioned in generally resilient relationship so as to cover this hole formed on the first planar surface 16. The first planar surface 16 and the second planar surface 18 have a generally rectangular, or square, configuration. Similarly, the chamber 20, extending between the first planar surface 16 and the second planar surface 18, has a generally square, or rectangular, configuration. The first planar surface 16 and the second planar surface 18 have an area which is generally greater than the area of the chamber 20. The weighted member 14 is received within the chamber 20 between the first planar surface 16 and the second planar surface 18. The hole of the first planar surface 16 and the opening 22 of the second planar surface 18 are contained within the area of the chamber 20. As can be seen, the opening 22 in the second planar surface 18 has a plurality of sections which are divided by first crossbar 24 and a second crossbar 26. Each of the crossbars 24 and 26 extend across the opening 22 so as to subdivide the opening 22 into its separate sections.

As can be seen in FIG. 2, direction indicia 28 are provided on the second planar surface 18. These direction indicia 28 indicate the "up" direction of the noise maker 10. During proper installation techniques, when the air filter 13 is placed in a vertical position, it will be necessary to position the noise maker 10 so that the edge 30 is the uppermost edge. The square configuration of the housing 12 assures that the noise maker apparatus 10 can be located in the proper position. Unlike conventional noise maker apparatus, the "square" configuration of the housing 12 avoids ambiguities in the proper positioning of the noise maker 10 on the air filter 13.

The weighted member 14 is a discoidal member that is slidably positioned on a dowel rod 32. The dowel rod is positioned so as to extend at an angle upwardly and outwardly relative to the first planar surface 16. The discoidal member 14 has a central opening which extends around the outer diameter of the dowel rod 32. The dowel rod 32 is affixed, at another end, to the crossbar 26. The dowel rod 32 serves to position the weighted member 14 in a resilient relationship relative to the hole formed on the first .planar surface 16. As will be described hereinafter, when a suitable pressure change acts on the first planar surface 16, the weighted member 14 will be lifted (or sucked) upwardly and outwardly from its first position on the dowel rod 32. The movement of the weighted member 14 will cause air to flow through the housing 12 so as to produce a "whistling" noise.

Importantly, a slider plate 34 is slidably received within the housing 12. In particular, the slider plate 34 is a rectangular member that is slidably received in slots formed on the chamber 22. The slider plate 34 is positioned in close juxtaposition to the surface 36 of the first planar surface 16. The slider plate 34 is interposed between the weighted member 14 and the hole formed on the first planar surface 16. The slider plate 34 includes transversely extending edge portions 38 and 40. These edge portions will abut the sides of the first planar surface 16 so as to limit the length of travel of the slider plate 34 relative to the chamber 20.

Figure 3:
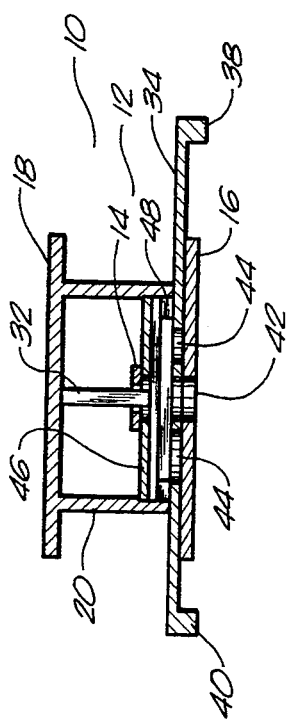
FIG. 3 is a cross-sectional view, in side elevation, of the noise maker apparatus of the present invention.

FIG. 3 is a cross-sectional view of the noise maker apparatus 10 of the present invention. The noise maker apparatus 10 includes the housing 12. The housing 12 has the first planar surface 16 positioned at the bottom side and the second planar surface 18 positioned et the top side. The chamber 20 extends between the first planar surface 16 and the second planar surface 18. The chamber 20 has a generally rectangular cross-sectional area. Importantly, FIG. 3 shows the presence of the hole 42 formed through the first planer surface 16. As can be seen, the slider plate 34 is positioned in close Juxtaposition to the surface of the first planar surface 16. The slider plate 34 has a plurality of openings 44 formed therein. Each of the openings 44 is a hole of varying size. At least one of the holes 44 has a diameter which is less than the diameter of the hole 42.

A crossframe 46 extends across the interior of the chamber 20. Crossframe 46 also includes a hole formed centrally thereof. The dowel rod 32 has one end which extends into and central of the opening formed in the crossframe 46. As can be seen, the weighted discoidal member 14 resides covering this opening in the crossframe 46. In this position, the weighted member 14 serves to cover the hole in the crossframe 46 and to cover the hole 42 formed in the first planar surface 16. The weighted member 14 will reside in the position shown in FIG. 3 until a sufficient pressure drop occurs across the hole 42, through the hole of the slider plate 34 and through the hole formed in the crossframe 46 so as to displace the weighted member 14 to a position at a higher level on the dowel rod 32.

It should be noted that, for the purposes of the present invention, the crossframe 46 may or may not be included. Within the scope of the present invention, the dowel rod 32 can extend downwardly so as to be positioned generally centrally of the hole 42 of the first planar surface 16. This positioning enhances the whistle tone which is emitted by the noise maker 10. Similarly, the weighted member 14 can reside in a position so as to cover the hole 42, or the hole 44 in the slider plate 34. As used herein, the weighted member 14 is in a resilient relationship relative to the hole 42 of the first planar surface 16 or the hole 44 of the slider plate 34.

FIG. 4 shows the transverse cross-sectional view of the noise maker apparatus 10 of the present invention. As can be seen, the housing 12 includes a chamber 20 interposed between the first planar surface 16 and the second planar surface 18. The first planar surface 16, the second position 18 and the chamber 20 are permanently coupled together. In particular, it can be seen that the first planar surface 16 includes flanges 50 and 52 which are fastened to the inner walls of the chamber 20. These flanges 50 and 52 extend upwardly from the first planar surface 16. These flanges 50 and 52 can be fastened to the inner surface of chamber 20 by adhesives, welding, or other techniques.

The dowel rod 32 extends upwardly from the opening on the crossframe 46. The angled configuration of the dowel rod 32 (in combination with gravity) serves to provide the resilient contact between the weighted member 14 and the hole of the crossframe 46 (or the hole 42 of the first planar surface 16). As a pressure change occurs across the hole 42 on the first planar surface 16, the weighted member 14 will be displaced and will rise along the angled surface of the dowel rod 32.

Figure 5:
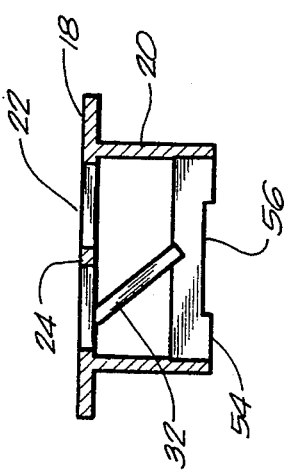
FIG. 5 is a side view of the second planar surface and chamber of the noise maker of the present invention.

FIG. 5 illustrates the configuration of the chamber 20 and the second planer surface 18. As shown in FIG. 5, the second planer surface 18 and the chamber 20 ere integrally formed together in a conventional plastic molding fashion. The crossbar 24 is illustrated as extending across the opening 22 formed in the second planer surface 18. The opening 22 contained within the area of the chamber 20. As such, the opening 22 allows a free flow of air therethrough. The dowel rod 32 is affixed to the crossbar 26 and extends downwardly at an angle therefrom. The bottom edge 54 of the housing 20 includes a slot 56. Slot 56 serves to receive the sliding plate 34 in close Juxtaposition with the first planar surface 16. The slider plate 34 will be received between the slot 56 and the first planar surface 16.

Figure 6:
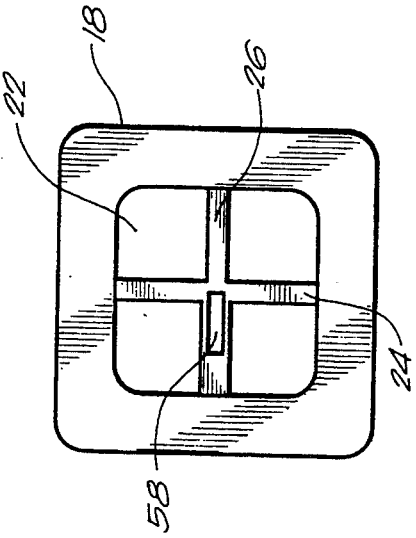
FIG. 6 is a top plan view of the noise maker apparatus of the present invention.

FIG. 6 shows a top view of the second planar surface 18. As can be seen, the second planar surface 18 has a generally square or rectangular configuration. The opening 22 is formed centrally of the second planar surface 18. Crossbars 24 and 26 extend across the opening 22 in a crossed pattern. As can be seen, a slot 58 is formed through the second crossbar 26. Slot 58 is formed during the molding process when the dowel rod 32 is formed so as to extend downwardly, at an angle, toward the hole in the first planar surface 16.

Figure 7:
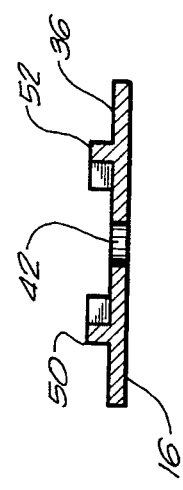
FIG. 7 is a bottom view of the first planar surface of the present invention.

FIG. 7 illustrates a configuration of the first planar surface 16. As can be seen, the first planar surface 16 is a generally solid square section of plastic material. A hole 42 is formed centrally of the first planar surface 16. Mole 42 is positioned so as to allow air to pass therethrough. The first planar surface 16 will be generally positioned on the upstream side of the air filter. Typically, the use of the weighted member 14 will prevent air from bassing freely through the hole 42. However, when the air filter becomes sufficiently clogged, then the motor in the HVAC system will tend to draw air through the hole 42 and serve to displace the weighted member 14 from its position in resilient covering relationship to the hole 42. This will allow air to pass through hole 42 toward the opening 22 on the second planar surface 18. Such a movement of air will create a "whistling" sound through the noise maker 10 of the present invention.

Figure 8:
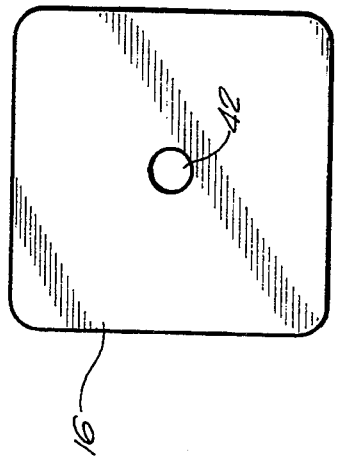
FIG. 8 is a cross-sectional view of the first planar surface of the noise maker of the present invention.

FIG. 8 is a cross-sectional view of the first planar surface 16. As can be seen, the flange members 50 and 52 ere formed on the top surface 36 of the first planar surface 16. These flanges 50 and 52 serve to allow the first planar surface 16 to be permanently coupled to the chamber 20. The hole 42 extends centrally between the flanges 50 and 52. The hole 42 extends through the thickness of the first planar surface 16.

Figure 9:
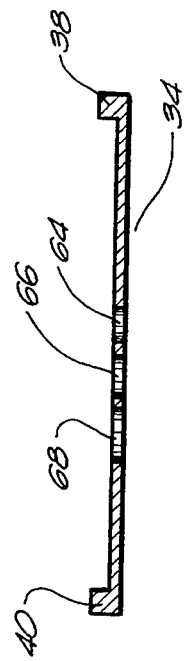
FIG. 9 is an isolated plan view of the slider plate of the noise maker of the present invention.

FIG. 9 illustrates the slider plate 34 of the present invention. As can be seen, the slider plate 34 includes a first hole size 64, a second hole size 66, and a third hole size 68. The hole size 68 is of a greater diameter than that of the hole size 66. The hole size 66 is of a greater diameter than the hole size 64. These holes 64, 66 and 68 are placed generally centrally across the length of the slider plate 34. The areas of the slider plate 34, without a hole, can be suitable for blocking air flowing through the noise maker of the present invention. The ends 38 and 40 are positioned for easy grasping and will extend outwardly beyond the sides of the planar surfaces 16 and 18. In normal use, depending on the capacity of the system employed, the hole sizes 64, 66, and 68 will be aligned with the hole 42 on the first planar surface 16.

Figure 10:
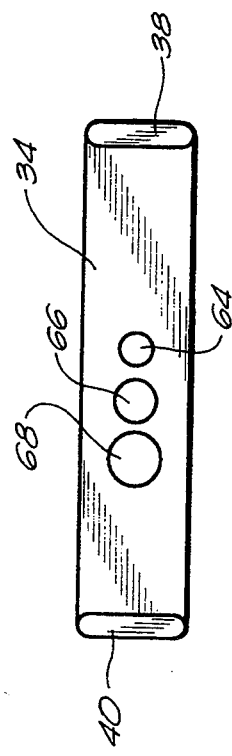
FIG. 10 is a cross-sectional view of the slider plate of the noise maker of the present invention.

FIG. 10 shows a cross-sectional view of the slider plate 34 of the present invention. As can be seen, the hole sizes 64, 66 and 68 extend through the thickness of the slider plate 34. The ends 38 and 40 extend transversely to the surface of the slider plate 34 so as to provide a proper stop, or limit, to the sliding relationship between the slider plate 34 and the chamber 20 of the noise maker apparatus 10.

The present invention provides a proper noise maker for an air filter that greatly enhances the ability to prevent a clogged condition of the air filter. High efficiency permanent/reusable air filters, due to their very nature and design, inherently become clogged sooner than the throw-away "low efficiency" products. The "high efficiency" filter will restrict a greater amount of dust and dirt from passing through its filtering layers. Normally, this will create a potential disadvantage, due to the fact that these high efficiency filters can become dangerously clogged if the consumer waits to clean the filter until the same time as when they would have otherwise replaced a throw-away filter. Human nature being what it is, the consumer is unlikely to keep up with the more frequent cleaning required of these permanent filters, especially in the short term immediately following installation. Therefore, the present invention provides an alarm device that is desirable for the purpose of alerting the air filter owner of the need to clean the air filter before the filtering effect is minimized and before the motor burns out in the HVAC system.

The noise maker apparatus 10 of the present invention is a one-piece permanently assembled item. The noise maker apparatus of the present invention cannot be disassembled or taken apart after installation. The noise maker apparatus of the present invention is intended to remain affixed to the filter in which it is first installed and manufactured.

The present invention utilizes a specially designed square configuration. This allows a clear indication of "up" orientation in relation to the sides of the filter. As a result, it becomes difficult, or impossible, to improperly install the noise maker apparatus in the air filter or to improperly position the air filter.

The present invention features the use of a "weighted disk" which is held in a closed position due to the gravitational effect of the slanted dowel rod on which the disk is mounted. Since the slanted dowel rod is used for the purpose of maintaining the "weighted disk" in its resilient relationship to the hole, it is necessary that the noise maker of the present invention be placed in a vertical "up" position when the filter is used vertically, as on a wall. This assures that the weighted member is urged toward the bottom of the dowel rod so that it will sit and cover the open whistle hole. When the filter is used horizontally, the position of the noise maker will not be so important as the disk will always tend to fall toward the bottom of the dowel rod and to cover the open whistle hole.

The weight of the disk is quite important. A heavier disk will require that the filter become more clogged before the resulting pressure drop from the fen suction will be sufficient to lift the disk up along the dowel rod and therefore start the whistling effect of the noise maker. The use of the "weighted disk" of the present invention prevents air from passing through the noise maker until the filter has become clogged. Therefore, no dust or other contaminants will be able to pass through the hole in the noise maker until the filter has reached the point at which it should be removed and cleaned.

The present invention features a movable slider plate having several different hole sizes. This serves the purpose of providing the consumer with a choice as to the sound level which will emanate from the noise maker. This sound level will be in relation to the amount of dirt collected in the filter. It also provides for an "off" setting by positioning the slider plate so that no hole is aligned with the hole in the first planar surface. Such an "off" setting may be useful et times when the filter becomes clogged but it is not practical or convenient to tend to the cleaning process until a few days later.

The foregoing disclosure and description of the invention is illustrative and explanatory thereof. Various changes in the details of the illustrated construction may be made within the scope of the appended claims without departing from the true spirit of the invention. For example, the present invention can utilize a weighted disk, a hinged door, a rubber gasket type closure, a ball bearing type device, a door behind a plastic spring, or a door behind a round "coil" spring so as to achieve a similar effect as the present invention. Also, slider type devices can be used, round rotatable devices, or changable plates can be employed for the purpose of varying the size of the hole through which air must pass. The present invention should only be limited by the following claims and their legal equivalents .

I claim:

1. A noise maker comprising:
   a housing having a hole formed on at least one surface of said housing; and
   a member in resilient relationship over said hole, said member movable from a first position closing said hole to a second position for allowing a desired volume of air to flow through said hole so as to produce an audible sound, said housing having said hole formed in a first surface of said housing, said housing having an opening formed on a second surface of said housing, said member interposed between said first surface and said second surface, said housing having a rectangular chamber extending between said first surface and said second surface, said member positioned within said chamber.

2. The noise maker of claim 1, said member comprising a weighted discoidal member having a diameter greater than said hole, said discoidal member restrictive of air flow through said hole in said first position.

3. The noise maker of claim 1, said member being responsive to a pressure change across said hole, said member movable to said second position in response to a pressure change beyond a desired level.

4. The noise maker of claim 1, further comprising:
   a means for varying a diameter of said hole, said means affixed in slidable relationship to said housing.

5. The noise maker of claim 4, said means comprising:
   a slider plate having a plurality of hole sizes formed therein, said slider plate being interposed between said hole and said member.

6. The noise maker of claim 1, further comprising:
   an air filter extending around an exterior of said housing, said housing permanently affixed to said air filter.

7. The noise maker of claim 1, said housing having said hole formed in a first planar surface of said housing, said housing having an opening formed in a second planar surface of said housing, said first planar surface and said second planar surface in parallel relationship, said housing having a chamber extending between said first planar surface and said second planar surface, said first and second planar surfaces and said chamber being permanently coupled together.

8. A noise maker comprising:
   a housing having a hole formed on at least one surface of said housing; and
   a member in resilient relationship over said hole, said member movable from a first position closing said hole to a second position for allowing a desired volume of air to flow through said hole so as to produce an audible sound, said member slidably mounted on a dowel rod within said housing, said member at a lowermost position on said dowel rod in said first position, said second position being on a higher level of said dowel rod.

9. The noise maker of claim 8, said dowel rod having a lowermost end positioned centrally of said hole, said dowel rod extending upwardly and outwardly from said hole.

10. A noise maker for an air filter comprising:
    a housing having a hole formed on at least one surface of said housing, said housing having an opening formed on another surface of said housing; and
    a plate having a plurality of hole sizes formed thereon, said plate positioned in said housing adjacent to said hole, said plate affixed in slidable relationship within said housing, at least a portion of said hole sizes having a smaller diameter than said hole.

11. The noise maker of claim 10, further comprising:
    a member in resilient relationship relative to said hole, said member movable from a first position covering said hole to a second position for allowing a sufficient volume of air flow through said hole so as to produce an audible sound.

12. The noise maker of claim 11, said member slidably mounted on a dowel rod within said housing, said member at e lowermost position on said dowel rod in said first position, said second position being on a higher level of said dowel rod.

13. The noise maker of claim 11, said member interposed between said surfaces of said housing, said housing having e rectangular chamber extending between said surfaces, said member positioned within said chamber.

14. The noise maker of claims 10, said housing having said hole formed in a first planar surface of said housing, said housing having said opening formed on a second planar surface of said housing, said first planar surface and said second planar surface in generally parallel relationship, said housing having a chamber extending between said first planar surface and said second planar surface, said first and second planar surfaces and said chamber being permanently coupled together.

15. A noise maker for an air filter comprising:
    a first planar surface having a hole formed thereon;
    a second planar surface having an opening formed thereon, said second planar surface in generally parallel relationship to said first planar surface; and
    a chamber permanently affixed to and extending between said first planar surface and said second planar surface, said hole and said opening positioned so as to be within an area of said chamber, said first and second planar surfaces having a rectangular configuration, each of said first and second planar surfaces having an area greater than an area of said front section of said chamber, said chamber having a rectangular cross-section, said opening having a greater area than said hole.

16. The noise maker of claim 15, further comprising:
    a weighted member in resilient relationship over said hole, said weighted member movable between a first position closing said hole to a second position for allowing a desired volume of air to flow through said hole so as to produce an audible sound.

* * * * *